A. NELSON.
MULTIPLE HORSE HOLDER AND RELEASER.
APPLICATION FILED MAY 21, 1917. RENEWED MAY 31, 1918.
1,284,428.
Patented Nov. 12, 1918.
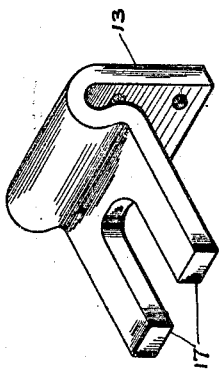
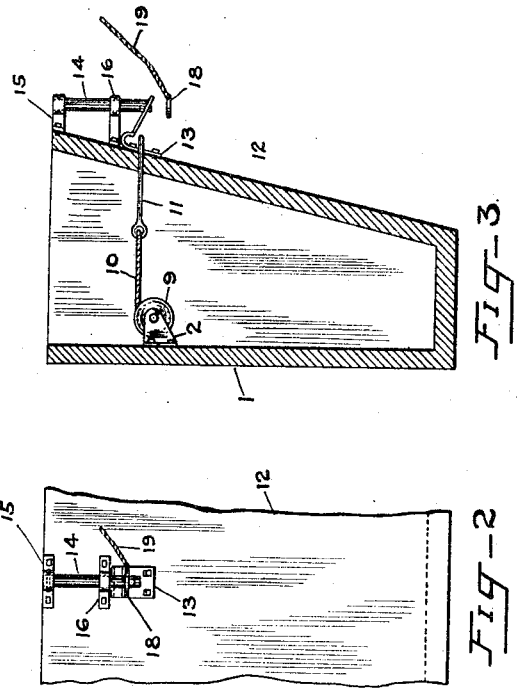
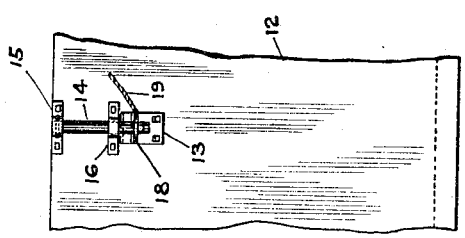
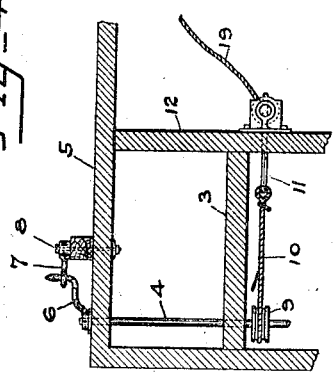
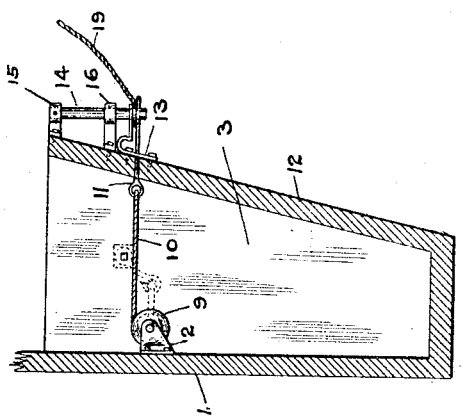
Inventor.
A. Nelson
By H.J. Sanders
Atty.

UNITED STATES PATENT OFFICE.

ANDREW NELSON, OF EASTLAKE, MICHIGAN.

MULTIPLE HORSE HOLDER AND RELEASER.

1,284,428. Specification of Letters Patent. Patented Nov. 12, 1918.

Application filed May 21, 1917, Serial No. 170,036. Renewed May 31, 1918. Serial No. 237,622.

*To all whom it may concern:*

Be it known that I, ANDREW NELSON, a citizen of the United States, residing at Eastlake, in the county of Manistee and State of Michigan, have invented certain new and useful Improvements in Multiple Horse Holders and Releasers, of which the following is a specification.

This invention relates to improvements in multiple horse holders and releasers and its primary object is to provide means for normally retaining a number of animals in a series of stalls with means for simultaneously releasing the animals in time of necessity. With the foregoing and other objects in view the invention consists in the combination and arrangement of parts to be hereinafter fully described, pointed out in the appended claims and illustrated in the accompanying drawing which forms a part of this specification and in which—

Figure 1 is a fragmentary view of a stable illustrating the application of my invention.

Fig. 2 is a front view of Fig. 1.

Fig. 3 is a view of Fig. 1 with the movable parts in an altered position.

Fig. 4 is a plan view of Fig. 1.

Fig. 5 is a perspective view of the type of spring employed.

Like reference characters denote corresponding parts throughout.

To the stable wall 1 I secure a plurality of brackets 2 within the several stalls 3 which brackets serve as bearings for the rotary rod 4 which extends through the several stalls and through one end wall 5 of the stable and is provided with an operating handle 6 normally retained in engagement with a hook 7 carried by a bolt 8 that extends through the said wall 5. Within each stall 3 a pulley 9 is fast upon said rod 4 and a cord 10 with one end fast to said pulley is connected to a pin 11 which extends through the wall 12 of the feed trough and through a spring bracket 13 secured to the said wall 12 and through an aperture formed in the free end of a retaining bolt 14 which bolt is carried by a bracket 15 fast to the wall 12 and which bolt, further, extends through a guide bracket 16 also secured to said wall 12 below the bracket 15.

The free end of the spring bracket 13 is bifurcated to form prongs 17 which engage with the said bolt 14 above the pin 11 and between the said members 11, 13 the hitching ring 18 provided with halter rope 19 is retained upon the said bolt 14. To release one animal at a time from any of the stalls the halter strap is simply unhooked in the usual manner. To release all of the animals simultaneously the handle 6 is manually moved out of engagement with the hook 7 and the rod 4 rotated by said handle in a direction to cause the several cords 10 to wind upon the pulleys 9 thus withdrawing the pins 11 from the bolts 14 when the spring brackets, which act normally to press the rings 18 against the said pins 11, will act to force said rings off the bolts 14 thus freeing the animals.

What is claimed is:—

1. In combination with a rotary rod, pulleys, apertured bolts disposed in a plane at right angles to said rod, pins extending through the apertured portions of said bolts, cords connecting said pins with said pulleys, and spring brackets engaging with said apertured bolts directly above said pins.

2. In combination with a rotary rod disposed in a horizontal plane, pulleys fast to said rod, apertured bolts disposed in a vertical plane, pins extending through the apertures in said bolts, cords connecting said pins and said pulleys, and spring brackets having bifurcated free extremities normally in slidable engagement with said apertured bolts, said brackets being arranged directly above said pins.

3. In combination with a rotary rod, vertically disposed bolts, spring brackets slidably engaging said bolts, and means releasably connecting said bolts and the said rotary rod whereby said spring brackets are normally retained under tension, the connection between said bolts and rods being severed upon rotation of said rod in a given direction.

In testimony that I claim the foregoing as my own I have hereto affixed my signature in the presence of two subscribing witnesses.

ANDREW NELSON.

Witnesses:
OSCAR F. LUNDBOM,
ANDREW JOHNSON.

Copies of this patent may be obtained for five cents each, by addressing the "Commissioner of Patents, Washington, D. C."